Jan. 14, 1969    G. C. OPPENLANDER    3,422,171
PROCESS FOR PRODUCING FOAMED POLYPROPYLENE MONOFILAMENT
Filed July 7, 1965

GEORGE C. OPPENLANDER
INVENTOR.

BY

AGENT

United States Patent Office 3,422,171
Patented Jan. 14, 1969

3,422,171
**PROCESS FOR PRODUCING FOAMED POLY-
PROPYLENE MONOFILAMENT**
George C. Oppenlander, Embreeville, Pa., assignor to
Hercules Incorporated, a corporation of Delaware
Filed July 7, 1965, Ser. No. 470,253
U.S. Cl. 264—51                                   2 Claims
Int. Cl. B29d 27/00; D01f 7/02

ABSTRACT OF THE DISCLOSURE

Fine denier (5–18 mils), foamed and oriented polypropylene monofilaments of low density (less than 0.6 g./cc.) and high strength (tenacity of at least 3.5 g./denier) are described. They are prepared by extruding a monofilament from a mixture of polypropylene and blowing agent and water quenching, at 10–80° C., the filament within ¼ inch from the die, after which the filament is oriented by stretching.

---

Figure 1:
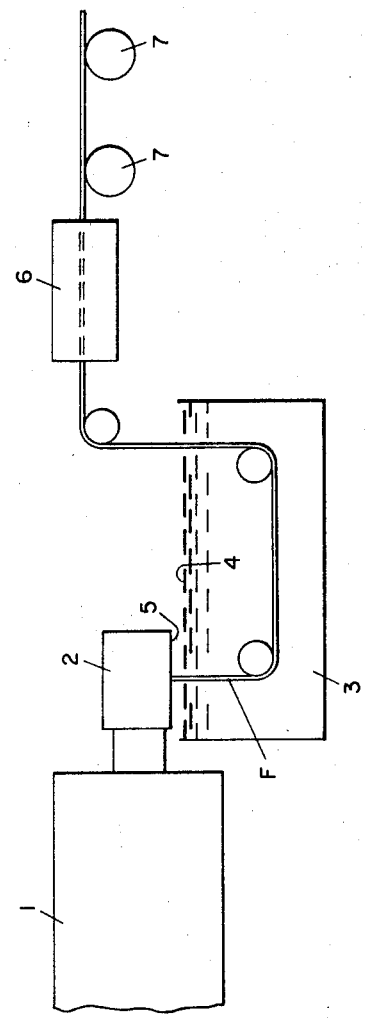

This invention relates to a process for producing foamed and oriented polypropylene monofilaments and the monofilaments so produced. More particularly, this invention relates to a process for producing foamed and oriented polypropylene monofilaments having a diameter of about 5 to about 18 mils, a density of less than about 0.6 g./cc. and a tenacity of at least 3.5 g./denier.

It is known that monofilaments consisting essentially of oriented stereoregular foamed polypropylene and having a density greater than 0.7 can be produced by melt extruding through a die a mixture of the polypropylene and sufficient blowing agent to produce about 1 to 15% blow, quenching or otherwise solidifying the filament so produced and subsequently softening and longitudinally stretching the filament. Such monofilaments having an effective blow-up of from 1 to 15% have diameters which range from 10 to 500 mils and preferably from 75 to 250 mils. For many purposes, however, it is desirable that the monofilament have a diameter of less than about 18 mils, high tenacity, and a higher bulk to weight ratio. Monofilaments having a density of less than 0.6 g./cc., such diameters and high tenacities, however, cannot be produced from polypropylene by such prior art processes.

Now, in accordance with the present invention it has been found that highly foamed, 5–18 mil monofilaments can be produced by conventional extrusion and drawing techniques provided that the extruded filament is water quenched immediately upon leaving the die, i.e., within a distance not greater than 0.25 inch from the face of the die at a temperature between about 10° C. and about 80° C. The exact reason why the quenching of such foamed monofilaments of propylene must be carried out in water within this temperature range and within such a short distance from the die face is not readily understood. It is postulated that the rapid quenching and cooling terminates foaming and blowing at a point where a maximum number of small uniform cells are produced but prior to the point where enlargement of cells and weakening of the cell walls takes place. It may also be due to the specific morphology of the polypropylene, that is, its crystalline state or to other reasons. No matter what occurs during the rapid water quenching of the foamed monofilament, it is important to the process of the invention that the quenching be carried out exactly as described since otherwise it is not possible to stretch the monofilament and achieve the advantages of the invention.

The polypropylene used in the practice of the invention is the essentially crystalline polymer of propylene often referred to as stereoregular polypropylene or isotactic or syndiotactic polypropylene.

The blowing agents used in accordance with the present invention are materials that yield at least 1 mole of gas per mole of blowing agent at the softening temperature of the polypropylene mixture. Many such materials are known. For example, the so-called chemical blowing agents such as azobisformamide, diazoaminobenzene, N,N'-dinitrosopentamethylene tetramine, N,N'-dimethyl-N,N'-dinitrosoterephthalamide, p,p'-oxybis(benzenesulfonyl semicarbazide), azobis(isobutyronitrile), p,p'-oxybis(benzenesulfonyl hydrazide), p,p'-diphenylbis(sulfonyl hydrazide), benzenesulfonyl hydrazide, m-benzenebis(sulfonyl hydrazide), and the like, can be used. Any of the well-known solvent blowing agents can also be used in this invention as, for example, monochlorotrifluoromethane, monochlorodifluoromethane, dichlorotetrafluoroethylene, trichloroethylene, chloroform, carbon tetrachloride, and low boiling hydrocarbons such as butane, pentane, hexane, etc. Accordingly, any compound or mixture of compounds which yields at least one mole of gas per mole of blowing agent at the softening temperature of the mixture can be used.

The amount of blowing agent employed will vary over a wide range depending on the nature and characteristics of the blowing agent and the extent of expansion desired. In general, an amount sufficient to form light cellular monofilaments having a density of from less than about 0.6 g./cc. to about 0.2 g./cc. will be used.

The polypropylene can also contain other materials such as stabilizers, pigments, extrusion aids, cross-linking agents, and the like, providing the presence of such materials does not adversely affect the advantages of the invention.

The process of the invention is suitably carried out by mixing the polypropylene with the blowing agent, and any other desired components such as stabilizers, pigments, and the like, in conventional manner, extruding the mixture by an extruder 1 (FIG. 1) through a monofilament die 2 at a temperature sufficiently high to release the gaseous blowing agent and at least to the softening temperature of the polypropylene mixture, rapidly quenching and solidifying the foamed monofilament F so produced in a water bath 3 at a temperature between about 10° and about 80° C. and having a water level that is within a distance not greater than 0.25 inch from the face 5 of the die 2, softening the monofilament F in a heating chamber 6 and then orienting the same by drawing by a pair of stretching rolls 7.

In monofilament spinning the size of the extrusion orifice in the die is essentially the same as the extruded filament to be produced taking into account, of course, the size variation which occurs immediately upon extrusion as the blowing agent is released and forms within the filament a multiplicity of minute cells. For purposes of the present invention the size of the orifice will range from about 15 to about 30 mils and preferably will be about 20 to about 30 mils.

The temperature employed for the extrusion, as mentioned above, will be sufficiently high to release the gaseous blowing agent and will be sufficient to maintain the polypropylene as a molten plastic which can be efficiently extruded. Generally, the extrusion temperature will be in the range of from about 180 to about 250° C. and usually in the range of from about 190 to about 210° C. Extrusion pressures will vary with the particular blowing agent and will range from about atmospheric to as high as 2000 or 4000 p.s.i.

The temperature at which the extruded foamed monofilament is quenched within ¼ inch from the face of the die is important to the practice of the invention and must be, as stated above, within the range of about 10 to about 80° C. and preferably within the range of about 15 to about 70° C.

After the foamed monofilament is quenched, it is heat softened to facilitate drawing. This can be accomplished in conventional manner, as by conducting the filament over heated rolls or through a heating chamber maintained at about 80° to about 150° C. The softened filament is then stretched longitudinally to increase the molecular orientation along the filament axis. Any amount of drawing will increase the molecular orientation. However, maximum benefits are attained when the draw ratio is in the range of about 4:1 to 8:1 and most preferably within the range of about 5:1 to 7:1.

The invention is further illustrated by reference to the following examples which are illustrative of and not necessarily limiting of the invention.

Example 1

In this example a mixture of stereoregular polypropylene having a birefringent melting point of 168–172° C. and an intrinsic viscosity of 1.7 (measured on a 0.1% solution in decahydronaphthalene at 135° C.) and containing 0.54% by weight of the polypropylene of 1,1'-azobisformamide was fed into a 1-inch screw extruder fitted with a geared metering pump and a die containing 4 orifices each of which had a diameter of 30 mils. The feed was passed through 3 zones of the extruder heated to 149°, 177°, and 193° C., respectively, through the pump and then out of the orifices as monofilaments at a rate of 27 g./min. into a 25° C. water bath located so that its surface was ¼ inch from the face of the die. The monofilaments were continuously transported from the water bath to a 5-foot oven heated to 149° C. and drawn 5.5 times at a linear rate after drawing of 470 ft./min. The diameter of the foamed filament prior to drawing was 33 mils and after drawing 15 mils. The drawn monofilaments had a density of 0.5 g./cc. (air pycnometer) and a tenacity of 4 g./denier.

The above procedure was duplicated except that the surface of the water bath was located ½ inch from the die face. It was impossible to draw the monofilament without breakage.

Example 2

In this example the polymeric mixture of Example 1 was fed into a 1-inch screw extruder fitted with a geared metering pump and a die containing 8 orifices each of which had a diameter of 20 mils. The feed was passes through 3 zones of the extruder heated to 163°, 177°, and 182° C., respectively, through the pump and then out of the orifices as monofilament at a rate of 14 g./min. into a 48° C. water bath located so that its surface was ⅛-inch from the face of the die and over rolls rotating at 76 ft./min. The monofilaments were continuously transported from the water bath to a 5-foot oven heated to 93° C. and drawn 5.5 times at a linear rate after drawing of 418 ft./min. The diameter of the foamed filaments prior to drawing was 14 mils and after drawing 6 mils. The drawn monofilaments had a density of 0.5 g./cc. and a tenactiy of 4.5 g./denier. When the above procedure was duplicated except that the surface of the water bath was located ½ inch and 1 inch, respectively, from the face of the die, it was not possible to draw the monofilaments without breakage.

What I claim and desire to protect by Letters Patent is:

1. A process for producing a foamed and oriented polypropylene monofilament having a diameter of from about 5 to about 18 mils, a density less than about 0.6 g./cc., and a tenacity of at least 3.5 g./denier which comprises
    (1) extruding through a die having an orifice size from about 15 to about 30 mils a monofilament from a mixture of polypropylene and a blowing agent at a temperature above the softening temperature of said mixture to form a foamed monofilament,
    (2) passing the foamed monofilament into a water quench within a distance not greater than 0.25 inch from the face of the die while maintaining the temperature of the quench at between about 10° C. and 80° C., and
    (3) orienting the monofilament by drawing at a draw ratio in the range of about 4:1 to 8:1.

2. A foamed and oriented poypropylene monofilament having a diameter of about 5 to about 18 mils, a density of less than about 0.6 g./cc., and a tenacity of at least 3.5 g./denier, said monofilament having a fine, uniform cellular structure.

References Cited

UNITED STATES PATENTS

| | | | |
|---|---|---|---|
| 3,026,273 | 3/1962 | Engles | 264—53 XR |
| 3,118,161 | 1/1964 | Cramton. | |

FOREIGN PATENTS

| | | |
|---|---|---|
| 683,415 | 3/1964 | Canada. |

JULIUS FROME, *Primary Examiner.*

PHILIP E. ANDERSON, *Assistant Examiner.*

U.S. Cl. X.R.

264—52, 54, 210